United States Patent [19]
Tayama

[11] Patent Number: 4,720,849
[45] Date of Patent: Jan. 19, 1988

[54] INFORMATION DISPLAY APPARATUS

[76] Inventor: Kou Tayama, Chescom Service Engineering K.K. Shinjuku NS Bldg 18F, 1, Nishi-Shinjuku 2-Chome, Shinjuku-ku, Tokyo, Japan

[21] Appl. No.: 902,051

[22] Filed: Aug. 26, 1986

Related U.S. Application Data

[63] Continuation of Ser. No. 623,356, Jun. 22, 1984, abandoned.

[30] Foreign Application Priority Data

Jan. 18, 1984 [JP] Japan .................................. 59-6710
Feb. 20, 1984 [JP] Japan .................................. 59-30018
Mar. 16, 1984 [JP] Japan .................................. 59-52013

[51] Int. Cl.⁴ ............................................. H04M 1/26
[52] U.S. Cl. .................................... 379/90; 379/142; 379/355; 379/356; D14/52
[58] Field of Search ............... 379/355, 356, 359, 216, 379/90, 142

[56] References Cited

U.S. PATENT DOCUMENTS

| | | | |
|---|---|---|---|
| 3,254,162 | 5/1966 | Miller et al. | 179/90 BB |
| 4,029,908 | 6/1977 | Moseley et al. | 179/90 BB |
| 4,277,651 | 7/1981 | Fisher, II et al. | 179/90 BD X |
| 4,348,550 | 9/1982 | Pirz et al. | 179/90 B |
| 4,431,870 | 2/1984 | May et al. | 179/90 BB X |

Primary Examiner—James L. Dwyer
Attorney, Agent, or Firm—Browdy and Neimark

[57] ABSTRACT

An information display apparatus is disclosed, which includes a plurality of information display apparatus installed, for instance, in or in front of railroad station halls. Each information display apparatus comprises a display (i.e., a television screen), a keyboard and a telephone handset or the like. When the handset is unhooked while hotel information (of information about restaurants or travel agencies or commercial guides of mail-order sales companies or job offer guides, such information generally referred to as hotel information) is on display, a telephone circuit of the apparatus is connected directly to the front of a hotel, the information of which is on display.

14 Claims, 10 Drawing Figures

INFORMATION DISPLAY APPARATUS

This is a continuation of application Ser. No. 623,356, filed June 22, 1984, now abandoned.

BACKGROUND OF THE INVENTION

This invention relates to an information display apparatus and, more particularly, to an information display apparatus including a plurality of information display apparatuses, each of which has a display for displaying a variety of information and a telephone set which is to be automatically connected to a destination while information thereof is on display.

When one intends to select a hotel for room reservation among many hotels available in a pertinent area, he or she usually contact the front desks of hotels with reference to advertisement columns of telephone directories. Usually, therefore, one is to contact only a couple of hotels, and information about all available hotels is not to be obtained.

For this reason, it is very difficult to check into the most suited hotel.

The primary object of the present invention is to provide an information display apparatus, which is to display information of many hotels in succession on a display and a telephone set of which is to be connected to an intended hotel by merely unhooking the handset while information of that hotel is on display.

Another object of the present invention is to provide an information display apparatus, which includes a source discriminatingsection provided at the front desk of each subscriber hotel and discriminates the location of an information display apparatus as a source of an incoming call, thus providing for perfection of service.

A further object of the present invention is to provide an information display apparatus which is to provide facsimile guide to the user.

The information display apparatus according to the present information is installed in or in front of a railroad station hall, for instance, and it is to display hotel informatin, such as appearance, room interior and variour facilities, of many hotels in succession on a display screen. The user may find a suited hotel while information of successive hotels is displayed on the display being watched. By unhooking the handset while the information of the suited hotel is on display, the telephone set is connected to the front desk of that hotel, so that room reservation may be made by confirming the charge or the like.

BRIEF DESCRIPTION OF THE DRAWINGS

In the accompanying drawings illustrating preferred embodiments of the present invention.

DESCRIPTION OF THE PREFERRED EMBODIMENTS

Figure 1:
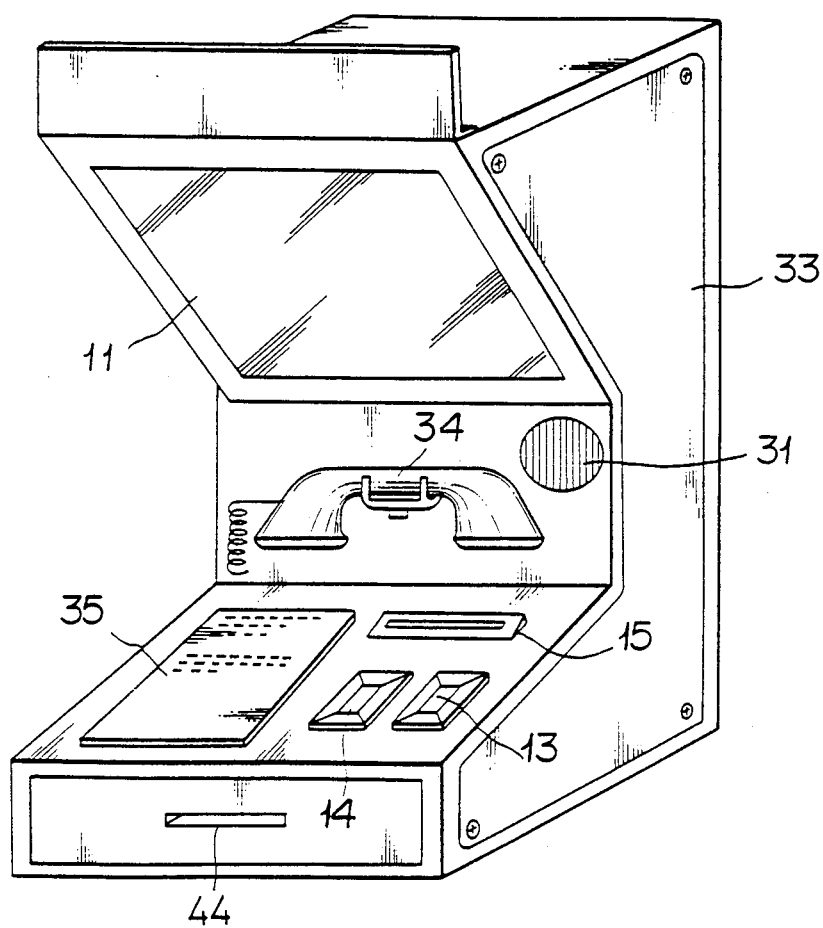
FIG. 1 is a perspective view showing a first embodiment.

Referring to the drawings, reference numeral 1 designates a logic control section, which includes a central processing unit 2, a program memory 3 and an I/O port 4.

Reference numeral 5 designates a display/memory control section, which includes a decoder 6, a video disc library 7 and a control circuit 8. The decoder 6 receives a control signal from the I/O port 4. The video disk on which is library 7 includes a disk recorded various information. The control circuit 8 controls the video disc library 7 according to the control signal provided from the decoder 6.

Figure 5:
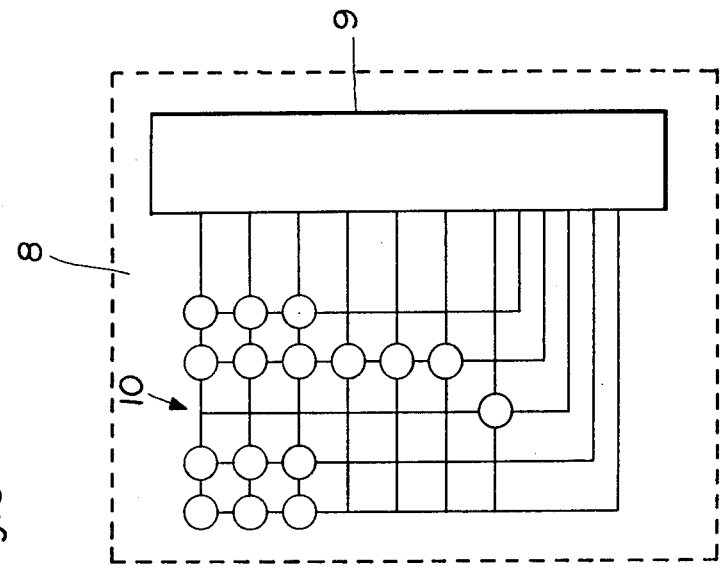
FIG. 5 is a schematic representation of a decoder and a control circuit.
Figure 5:
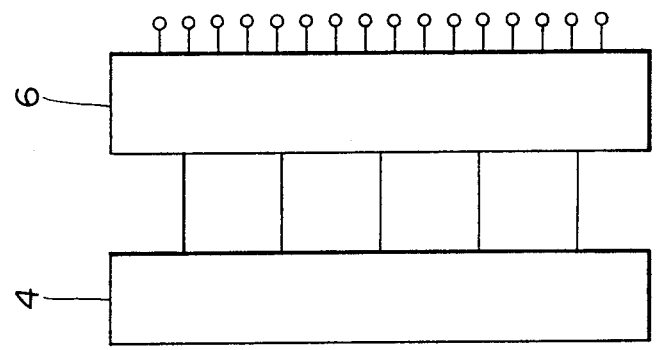

The control circuit 8, as shown in detail in FIG. 5, has a remote control unit 9 for controlling the video disc library 7 and an analog switch group 10 connected to the remote control unit 9. Individual switches of the analog switch group 10 are operated according to control signal from the decoder 6, thus operating the remote control unit 9 for controlling the video disc library 7.

Reference numeral 11 designates a display screen, which constitutes a display section for displaying signal reproduced by the display/memory control section 5. Reference numeral 12 designates an operating switch section, which includes a search switch 13 and a call switch 14 as shown in FIG. 1. Reference numeral 15 designates a coin/card insert section, which permits selective insertion of coins and cards. Reference numeral 16 designates a card reader section for restricting the users. This section is constructed such that coins are to be inserted as well. Reference numeral 17 designates a coin detector section for confirming the coin inserted through the card insert section 15. The card reader section 16 and coin detector section 17 are connected to the logic control section 1.

Reference numeral 18 designates a dial number memory section, in which dial numbers pertaining to various information recorded on video discs provided in the video disc library 7 are stored. Reference numeral 19 designates a dial number search section for searching for a dial number to be read out from the dial number memory section 18. Reference numeral 20 designates a telephone circuit control section connected to telephone circuit. It includes a push-button tone generator 21 for so-called push-button dial telephone set and a dial pulse relay section 22 for dial telephone set. Reference numeral 24 designates relay switches for the dial pulse relay section 22, and numeral 25 terminals to be connected to the telephone circuit. When a dial number of a destination displayed on the display section 11 is read out from the dial number memory section 18, it is once read into the dial number search section 19 and thence transferred through the I/O port 4 to the telephone circuit control section 20. When the telephone set employed is of the push-button type, it operates the dial pulse relay section 22 to continually hold the relay switch 24 "on". In this state, the push-button tone generator section 21 generates a destination telephone set call signal, whereby the telephone set is connected to an external telephone circuit. When the employed telephone set is of the dial type, the dial pulse relay section 22 on-off operates the relay switch 24 to generate dial pulses, whereby a call signal is sent to the external telephone circuit. Subsequently, the relay switch 24 is held "on".

Reference numeral 26 designates a voice control section which produces voice informing the user of how to use the apparatus. It includes a voice memory section 27, a counter section 28, an address section 29 and an amplifier 30. The voice memory section 27 produces various stored guide voices, e.g., "Push button" and "Unhook handset". The counter section 28 determines the period of start of reading of stored voice data and the address section 29 determines the position of start of reading. Reference numeral 31 designates a loudspeaker.

Figure 8:
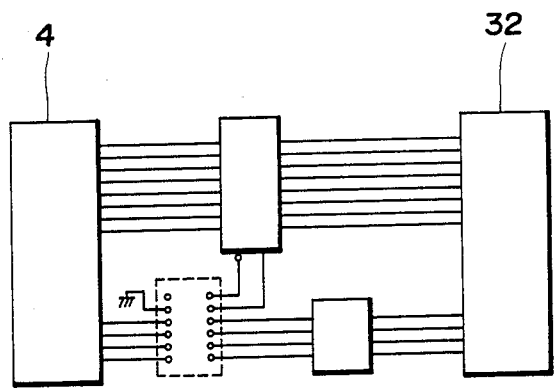
FIG. 8 is a connection diagram showing a printer.
Figure 9:
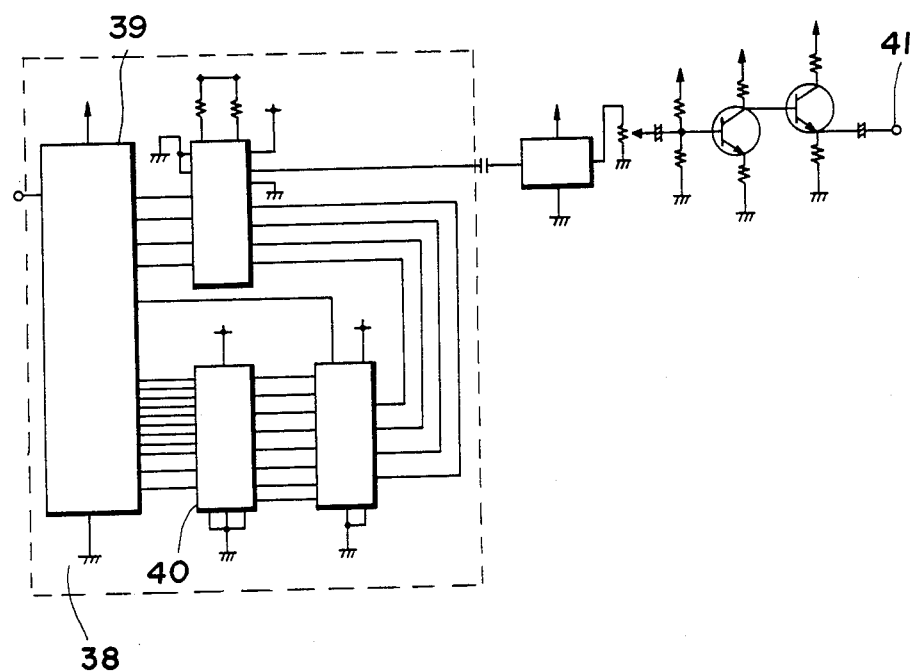
FIG. 9 is a circuit diagram showing a source discrimination unit.
Figure 10:
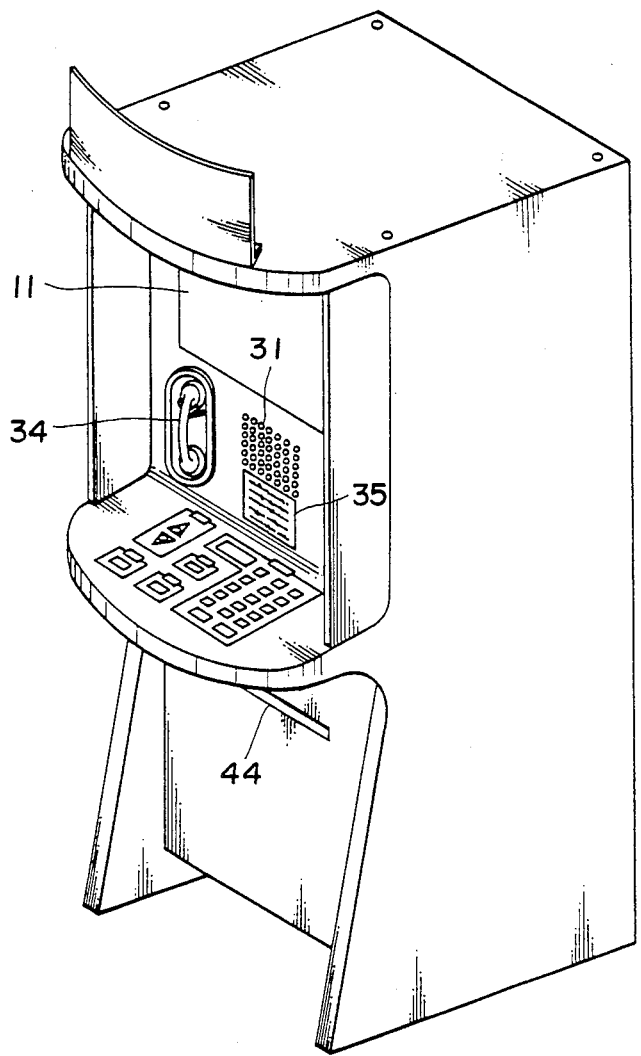
FIG. 10 is a perspective view showing a further embodiment of the present invention.

Reference numeral 32 designates a printer which is to print part or all of the information displayed on the display section 11 on a recording sheet. This printer is connected to the I/O port 4, as shown in FIG. 8. In the drawings, reference numeral 33 designates the console of the apparatus, numeral 34 the handset, numeral 35 a guide plate, on which a guide for use of the apparatus is described, and numeral 36 a destination telephone set.

Figure 6:
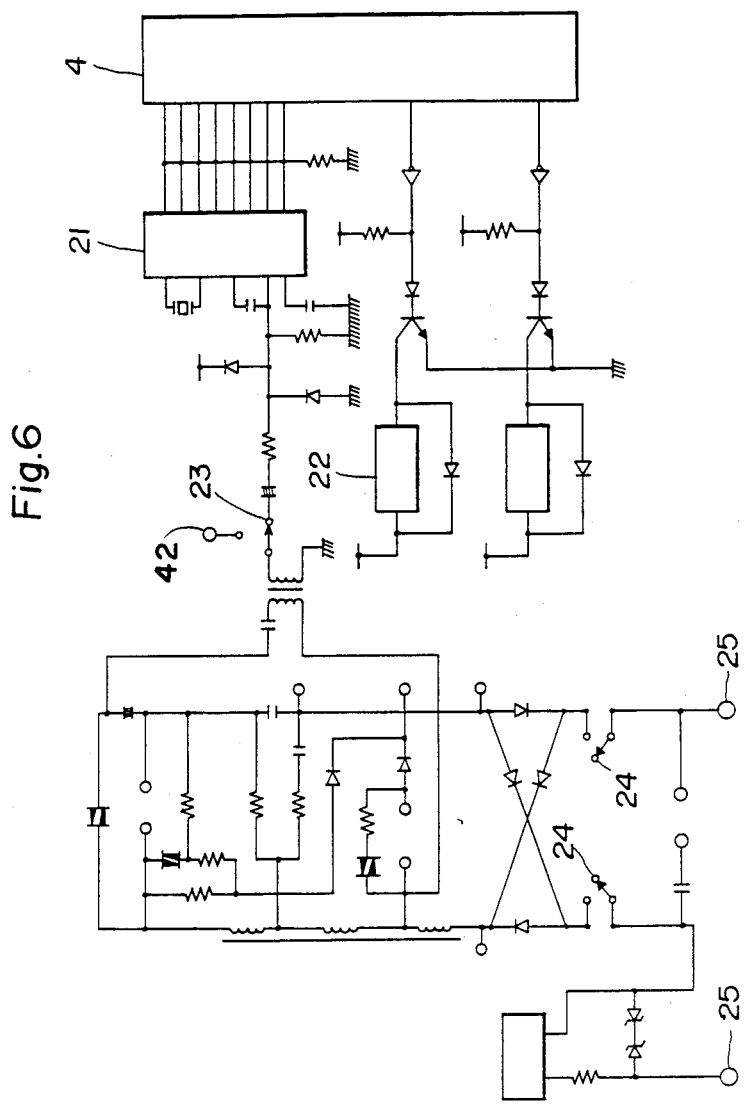
FIG. 6 is a circuit diagram of a telephone circuit control section.
Figure 7:
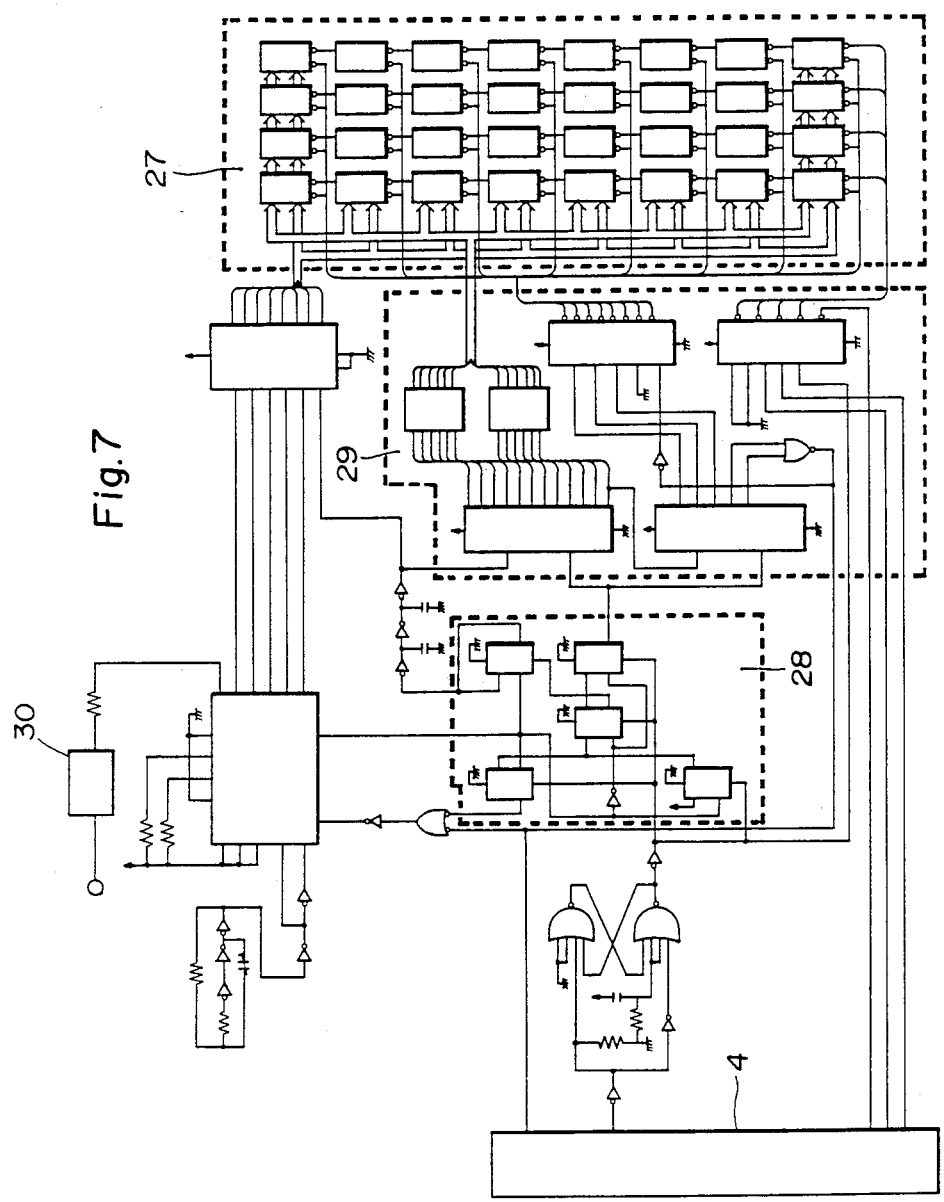
FIG. 7 is a circuit diagram showing a voice control section.

Reference numeral 38 designates a source discriminator section. It includes a hybrid IC 39 and a voide synthesis IC 40. When a telephone circuit to the destination telephone set 36 is set up, the source discriminator section 38 informs the destination of the location of the information display apparatus as a source of call. Reference numeral 41 designates a terminal which is connected to a terminal 42 shown in FIG. 6. Reference numeral 23 designates a relay switch which is operated by a relay 45. When a telephone circuit to the destination telephone set 36 is set up, the source discriminator section 38 is connected to and held in connection to the destination telephone set 36 for 1 to 2 seconds.

Figure 2:
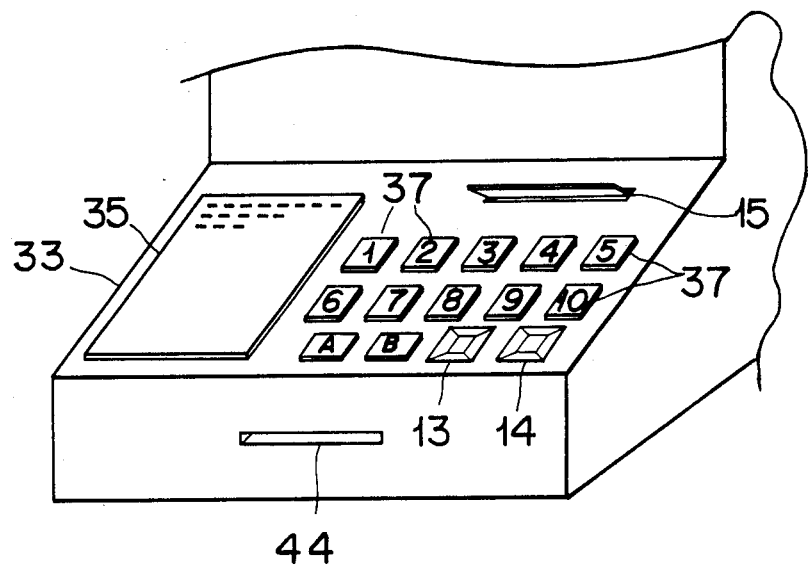
FIG. 2 is a perspective view showing a second embodiment.
Figure 3:
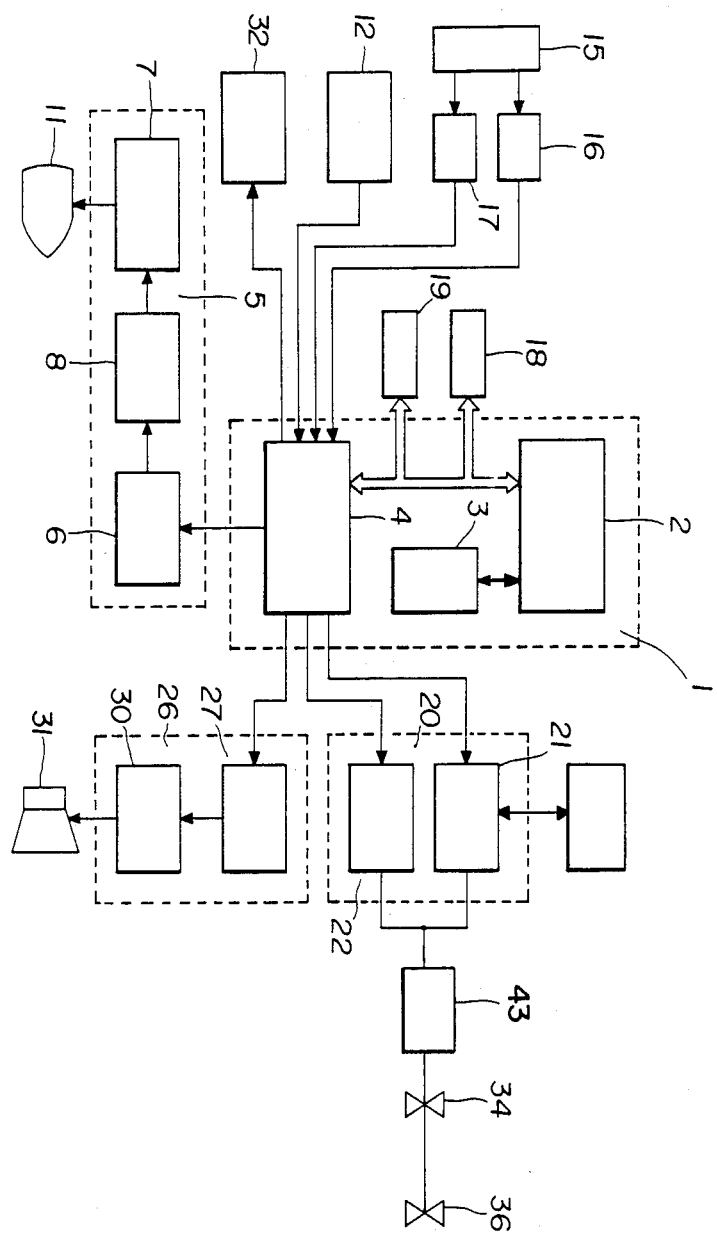
FIG. 3 is a block diagram showing the electric circuitry of the system according to the present invention.
Figure 4:
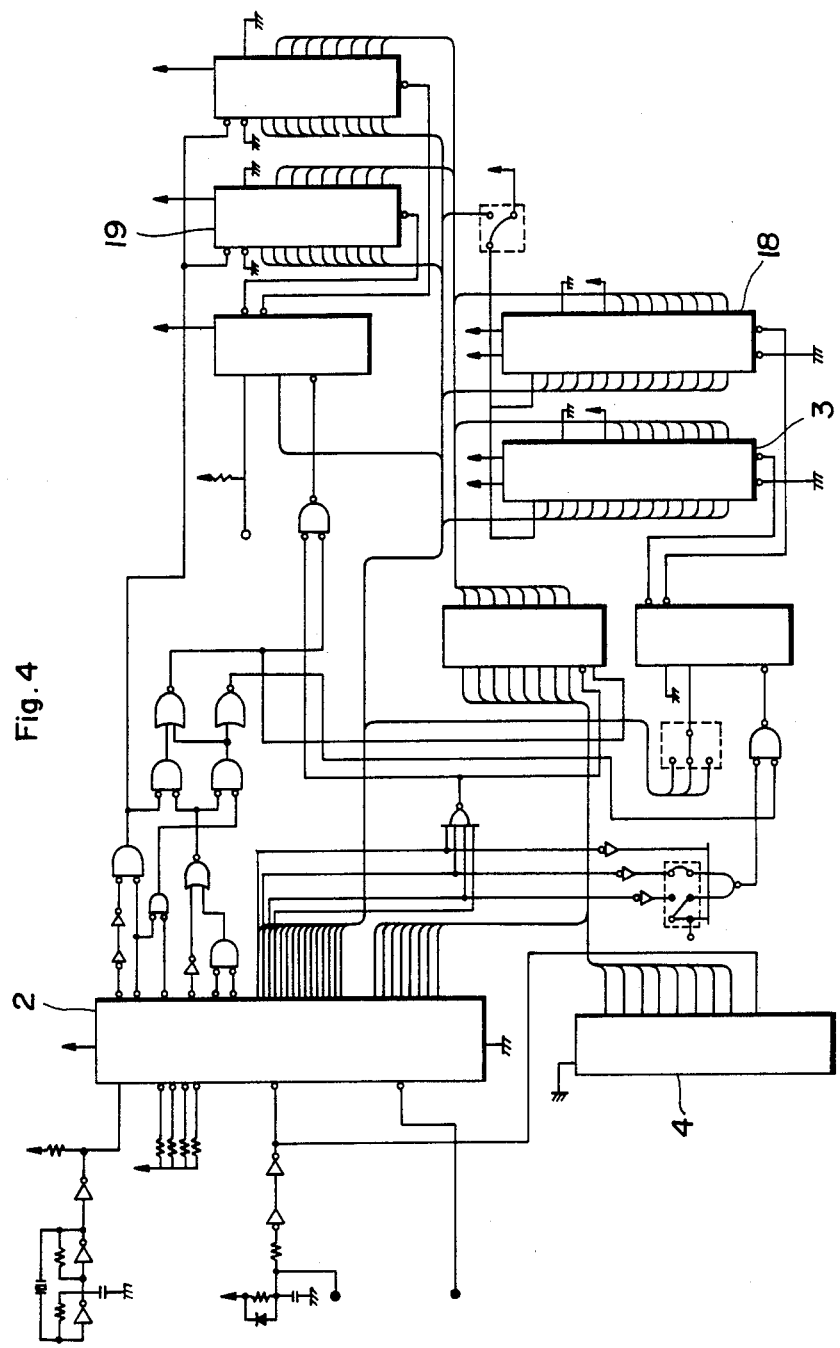
FIG. 4 is a schematic representation of a logic control section, a dial number memory section and a dial number search section.

FIG. 2 shows a second embodiment of the present invention. In this embodiment, numeral keys 37 are provided on the console 33. These keys 37 may be operated for selecting various video disc information in the video disc library 7. As an example, by operating the numeral key labeled "1" in FIG. 2, hotel information is displayed. By operating numeral key labeled "2", information of motion pictures is displayed. In this way, a variety of information accommodated in various video discs is to be selected for display.

Reference numeral 43 designates a facsimile set connected to the connection terminal 25 of the telephone circuit control section 20. Reference numeral 44 designates a record sheet outlet of the facsimile set 43.

The operation will now be described.

Video discs on which information of predetermined hotels is stored are provided in the video disc library 7 in the display/memory control section 5. When a power source for the apparatus provided in the console 33 is turned on, a variety of information is successively displayed on the display section 11, usually with a constant interval time (e.g., 10 seconds). At this time, only an outline, and not the details, of information is displayed on the display section 11. Of the successively displayed information, a desired item of information is selected by operating the numeral keys 37. For instance, by operating numeral key "1" in FIG. 2 hotel information is selected. By operating numeral key "2" information of motion picture theaters is selected. After the desired item of information is selected, the search switch 13 is operated. As a result, display information displayed on the display section 11 is fast fed, for instance at an interval of 5 seconds, to successively display the outline of hotels. When informatin of a suited hotel is displayed, the search key 13 is released. As a result, detailed information of that hotel (usually about three frames) are successively displayed, while at the same time commercial voice is produced from the loudspeaker 31. In this case, the last frame is displayed for a longer period, e.g., 10 seconds.

When the user is satisfied with the detailed information, he or she unhooks the handset 34, inserts a magnetic card (or a coin) into the card insert section 3, and depresses the call switch 14. As a result, the dial number corresponding to the displayed information is automatically searched from the dial number memory section 18, and a telephone circuit to the telephone set 36 in that hotel is set up. Before the user's speech starts, the destination hotel is informed of the location of the information display apparatus as the source of call in synthesized voice, for instance telling "New York" reproduced from data stored in the voice synthesis IC, for instance for a period of a couple of seconds.

If the user desires a detailed map, catalogue, charge table, etc. of the destination, it may be obtained from the facsimile set 43.

If the user does not want to make reservation, he or she may wait for 10 seconds or depress the search switch 13 once again. As a result, display of following outline information is resumed.

The procedure of operation as described is announced in voice to the user from the loudspeaker 31 through the voice control section 26 aside from the procedure guide described on the guide plate 35. For example, when the logic control section 1 determines that the next situation is for the search of a suited hotel, it takes out information of voice telling "Keep search button depressed until your favorite hotel is displayed." from the voice memory section 27 through the address section 29. The voice information is amplified through the amplifier 30 and uttered from the loudspeaker 31 at an output timing determined by the counter section 28.

As has been described before, in case when one intends to select a hotel for room reservation he or she usually contacts the fronts of hotels with reference to telephone directory advertisement columns so that he or she is to contact only a couple of hotels at the most. For this reason, if a called hotel has vacant room, the room is selected for reversation in most cases. That is, even if there are more suited hotels having vacant rooms, these hotels are not utilized for usually it is impossible to contact all the hotels in the pertient area one after another.

This is possible according to the present invention. In other words, with the information display apparatus according to the present invention, a number of hotels are displayed in succession, and merely unhooking the handset while information of a suited hotel is on display sets up the telephone circuit to that hotel. According to the present invention, it is thus only necessary to wait until information of a suited hotel appears on display.

What is claimed is:

1. An information display apparatus, comprising:
a video disk library accommodating a variety of different items of information;
a display section having a first input control, for initiating successive display of said items of information stored in said video disk library upon operation of said first input control by a user, each display having a unique phone number associated and corresponding with the display.

a dial number memory section in which dial numbers of destinations corresponding to said items of information are stored;

a dial number search section for selectively searching a dial number corresponding to the displayed information on the display section from said dial number memory section;

a handset connected to an external telephone circuit; and actuatable dialing means for automatically dialing said searched dial number;

wherein when said handset is lifted off-hook by said user, said dial number search section searches the dial number of the respective item of information being displayed, said dialing means dials said searched dial number, and said handset is automatically connected to a telephone set of the corresponding destination.

2. The information display apparatus according to claim 1, wherein a voice control section is provided for verbally informing the user how to use the apparatus by use of prerecorded messages at respective points in a process of utilizing the apparatus.

3. The information display apparatus according to claim 1, wherein a source discriminator section is provided for automatically sending a message for several seconds to the destination telephone set when the connection between said handset and the destination telephone set is set up.

4. The information display apparatus according to claim 1, wherein a printer is provided for printing at least a part of the information displayed on said display section on a recording sheet.

5. The information display apparatus according to claim 1, wherein a facsimile set is provided for receiving facsimile signals sent from said destination telephone set.

6. The information display apparatus according to claim 1, comprising numeral keys operable for selecting a desired item of said information stored in said video disc library for display thereof in said display section.

7. The information display apparatus according to claim 1, wherein said dialing means comprises means for receiving an actuation element provided by said user after lifting said handset, for said automatic dialing to the respective destination, and switch means, coupled with said receiving means, for actuating said dialing means when said actuation element is received in said receiving means.

8. The information display apparatus of claim 7, wherein said actuation element comprises a card bearing coded means, and said receiving means comprises means for reading said coded means.

9. The information display apparatus of claim 7, wherein said actuation element comprises a coin and said receiving means comprises coin detector means.

10. The apparatus of claim 1, comprising a logic control section including a central processor and an input/output port connected via a bus to said central processor, said dial number memory section and said dial number memory search section being connected to said logic control section by being connected to said bus, said display section including a decoder connected to said input/output port, a remote control connected between said video disk library in said decoder, and display means connected to said video disk library, and a telephone circuit control section connected between said input/output port and said telephone hand set.

11. The apparatus of claim 2, comprising a logic control section including a central processor and an input/output port connected via a bus to said central processor, said dial number memory section and said dial number memory search section being connected to said logic control section by being connected to said bus, said display section including a decoder connected to said input/output port, a remote control connected between said video disk library in said decoder, and display means connected to said video disk library, a telephone circuit control section connected between said input/output port and said telephone hand set, and said voice control section being connected to said input/output section.

12. The apparatus of claim 4, comprising a logic control section including a central processor and an input/output port connected via a bus to said central processor, said dial number memory section and said dial number memory search section being connected to said logic control section by being connected to said bus, said display section including a decoder connected to said input/output port, a remote control connected between said video disk library in said decoder, and display means connected to said video disk library, a telephone circuit control section connected between said input/output port and said telephone hand set, and said printer being connected to said input/output port.

13. The apparatus of claim 5, comprising a logic control section including a central processor and an input/output port connected via a bus to said central processor, said dial number memory section and said dial number memory search section being connected to said logic control section by being connected to said bus, said display section including a decoder connected to said input/output port, a remote control connected between said video disk library in said decoder, and display means connected to said video disk library, a telephone circuit control section connected between said input/output port and said telephone hand set, and said facsimile set being connected between said hand set and said telephone circuit control section.

14. The apparatus of claim 10, wherein each said destination by said external telephone circuit can operate said remote control to control the items of information of said video disk library that are successively displayed for said user.

* * * * *